(12) United States Patent
Bradshaw et al.

(10) Patent No.: US 6,985,412 B1
(45) Date of Patent: Jan. 10, 2006

(54) FOCUS SERVO CONTROLLER WITH COLLISION AVOIDANCE AND METHOD THEREFOR

(75) Inventors: Alex Bradshaw, Kawagoe (JP); Yuichi Kimikawa, Kawagoe (JP); Shinichi Naohara, Kawagoe (JP); Norio Matsuda, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/571,536

(22) Filed: May 16, 2000

(30) Foreign Application Priority Data

May 24, 1999 (JP) ................................. 11-143730

(51) Int. Cl.
*G11B 7/00* (2006.01)
(52) U.S. Cl. ................................. 369/44.29; 369/44.36
(58) Field of Classification Search ............. 369/44.29, 369/44.26, 44.36
See application file for complete search history.

(56) References Cited

U.S. PATENT DOCUMENTS

| | | | | |
|---|---|---|---|---|
| 5,010,538 | A | * | 4/1991 | Takeda et al. ........... 369/44.36 |
| 5,663,942 | A | | 9/1997 | Ishibashi et al. |
| 5,751,674 | A | | 5/1998 | Bradshaw et al. |
| 5,978,328 | A | | 11/1999 | Tanaka |
| 6,101,157 | A | | 8/2000 | Bradshaw et al. |
| 6,192,010 | B1 | * | 2/2001 | Wang et al. ............. 369/53.11 |
| 6,246,647 | B1 | * | 6/2001 | Tsutsui et al. ........... 369/44.29 |
| 6,252,835 | B1 | * | 6/2001 | Choi ....................... 369/44.29 |

FOREIGN PATENT DOCUMENTS

| | | |
|---|---|---|
| EP | 0 392 561 A2 | 10/1990 |
| EP | 0 745 981 A2 | 12/1996 |
| JP | 10-162485 * | 6/1998 |

OTHER PUBLICATIONS (MAT—machine assisted translation) of JP 10-162485.*
Patent Abstracts of Japan: 11073657, Pioneer Electronic Corporation: *Focus Control Device and Method.* Mar. 16, 1999, 09279078, abstract.
Patent Abstracts of Japan: 10097720, Nikon Corporation: *Information Recording and Reproducing Device*, Apr. 14, 1998, 08250005, abstract.

* cited by examiner

*Primary Examiner*—A M Psitos
(74) *Attorney, Agent, or Firm*—Sughrue Mion, PLLC

(57) ABSTRACT

Two sum output signals from two sets of the photodetector elements located symmetrically each other with respect to a light-receiving center of the photodetector of the optical pickup are amplified individually by two amplifiers. A focus error signal is generated in accordance with a difference between respective output levels of the two amplified signals. The gains of the two amplifiers are adjusted in accordance with the focus error signal. A predetermined bias voltage is applied to the focus error signal line in the focus servo control means in accordance with the focus error signal.

6 Claims, 3 Drawing Sheets

FOCUS SERVO CONTROLLER WITH COLLISION AVOIDANCE AND METHOD THEREFOR

BACKGROUND OF THE INVENTION

1. Field of the Invention

The present invention relates to a focus servo controller that operates to focus a reading light beam to be irradiated on the recording surface of an optical disc.

2. Description of the Related Art

An optical disc player is provided with a focus servo controller that generates a focus error signal in accordance with the respective light levels detected by a plurality of photodetector elements of a photodetector in an optical pickup. The focus servo controller controls the position of an objective lens in the direction of the optical axis so as to decrease the level of the focus error signal, in order to focus an irradiated light beam on the recording surface of the optical disc. In the case of a four-element photodetector, two sum output signals from two pairs of photodetector elements located symmetrically with respect to the intersection of two split lines on the light-receiving surface of the photodetector are generated at individual adders. On the other hand, a focus error signal is obtained by subtracting the output signal generated by one adder from the output signal generated by the other adder. Since the focus error signal has an S-curve characteristic versus focus error, the center of the S-curve characteristic is taken as the reference level (for example, zero) of the focus error signal.

The focus error signal is supplied to a driving system to drive a focus actuator in the optical pickup, thereby displacing the objective lens in the direction of the optical axis.

The focus servo controller has an ideal control state in which the RF signal (i.e., a read signal), the sum of the output signals of the four photodetector elements, has the maximum amplitude at the reference level of the focus error signal, or the jitter of the RF signal is minimized. However, it always happens that when the focus error signal becomes the reference level, the amplitude of the RF signal is not maximized (or the jitter of the RF signal is not minimized) due to errors of optical assembly of parts including the optical pickup. For this reason, adjustment is carried out so as to maximize the amplitude of the RF signal when the focus error signal becomes the reference level.

Such adjustment are known are the bias adjustment method in which a bias voltage is applied to the focus error signal line and the balance adjustment method in which the output levels of the aforementioned two adders are adjusted to keep balance between them. In the bias adjustment method, a bias voltage is first applied in order to eliminate a direct current component or an electrical offset component in the focus error signal before the focus servo operation is initiated.

Thereafter, the focus servo system is closed to initiate the focus servo operation and the bias voltage is adjusted to maximize the amplitude of the RF signal. In the balance adjustment, a bias voltage is first applied in order to eliminate a direct current component or an electrical offset component in the focus error signal before the focus servo operation is initiated. Thereafter, the focus servo system is closed to initiate the focus servo operation and the outputs of the two adders are adjusted to balance therebetween via individual amplifiers of which gains are adjustable, in order to maximize the amplitude of the RF signal.

However, in the case where the optical pickup goes out of focus due to vibration while the optical disc is being reproduced, no output signal is generated at each of the photodetector elements, so that the bias adjustment method will cause only the bias voltage to be applied suddenly to the line of the aforementioned driving system. This results in driving the objective lens to be significantly displaced, so that a problem arises that, depending on the level of the bias voltage, the objective lens is moved toward the optical disc to collide therewith, possibly leading to damage or failure of the optical disc. Moreover, in the balance adjustment method, the objective lens can move freely since zero voltage is supplied to the driving system, and thus the vibration that caused defocusing may also cause the objective lens to move significantly and collide with the optical disc resulting in damage or failure.

OBJECT AND SUMMARY OF THE INVENTION

Accordingly, an object of the present invention is to provide a focus servo controller which can prevent the objective lens from colliding with the optical disc when the objective lens goes out of focus.

According to the present invention, there is provided a focus servo controller which comprises: an optical pickup, having a photodetector including a plurality of photodetector elements, for irradiating a light beam on an optical recording medium and detecting a reflected light beam from the optical recording medium by means of the photodetector, amplifying means for amplifying the respective ones of two sum output signals from two sets of the photodetector elements located symmetrically each other with respect to a light-receiving center of the photodetector, focus servo control means for generating a focus error signal in accordance with a difference between respective output levels of the amplifying means and for moving an objective lens in the optical pickup in an optical axis direction of the light beam in accordance with the focus error signal when a focus servo operation start-up command is supplied, focus balance adjusting means for adjusting gains of the amplifying means in accordance with the focus error signal, and bias applying means for applying a bias voltage with a predetermined voltage to a focus error signal line in the focus servo control means in accordance with the focus error signal.

According to the present invention, there is provided a focus servo control method which comprises the steps of: irradiating a light beam on an optical recording medium, detecting a reflected light beam from the optical recording medium by means of a photodetector having a plurality of photodetector elements, amplifying, by means of amplifying means, the respective ones of two sum output signals from two sets of the photodetector elements located symmetrically each other with respect to a light-receiving center of the photodetector, generating a focus error signal in accordance with a difference between respective output levels of the amplifying means, moving an objective lens in an optical axis direction of the light beam in accordance with the focus error signal when a focus servo operation start-up command is supplied, applying a bias voltage to a focus error signal line in accordance with the focus error signal, generating the focus servo operation start-up command after the bias voltage has been applied, and varying the bias voltage applied to the focus error signal line by a predetermined voltage while adjusting gains of the amplifying means.

DETAILED DESCRIPTION OF THE PREFERRED EMBODIMENT

An embodiment of the present invention will be explained below in detail with reference to the drawings.

Figure 1:
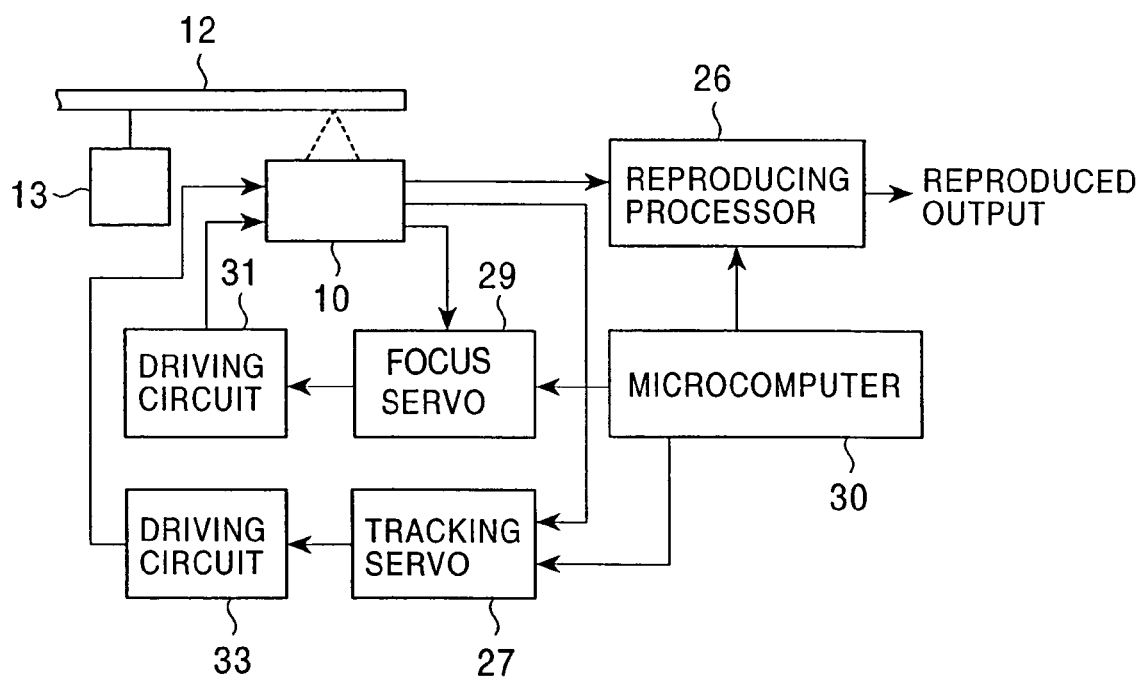
FIG. 1 is a block diagram showing an optical disc player having a focus servo controller according to the present invention.

FIG. 1 shows an optical disc player to which a focus servo controller and a method therefor according to the present invention are applied. In the optical disk player, an optical pickup 10 irradiates a laser beam on an optical disc 12 and then receives the reflected light beam from the optical disc 12 to generate a signal having a intensity according to the amount of the received light beam. The optical disc 12 is driven to rotate by means of a motor 13.

Figure 2:
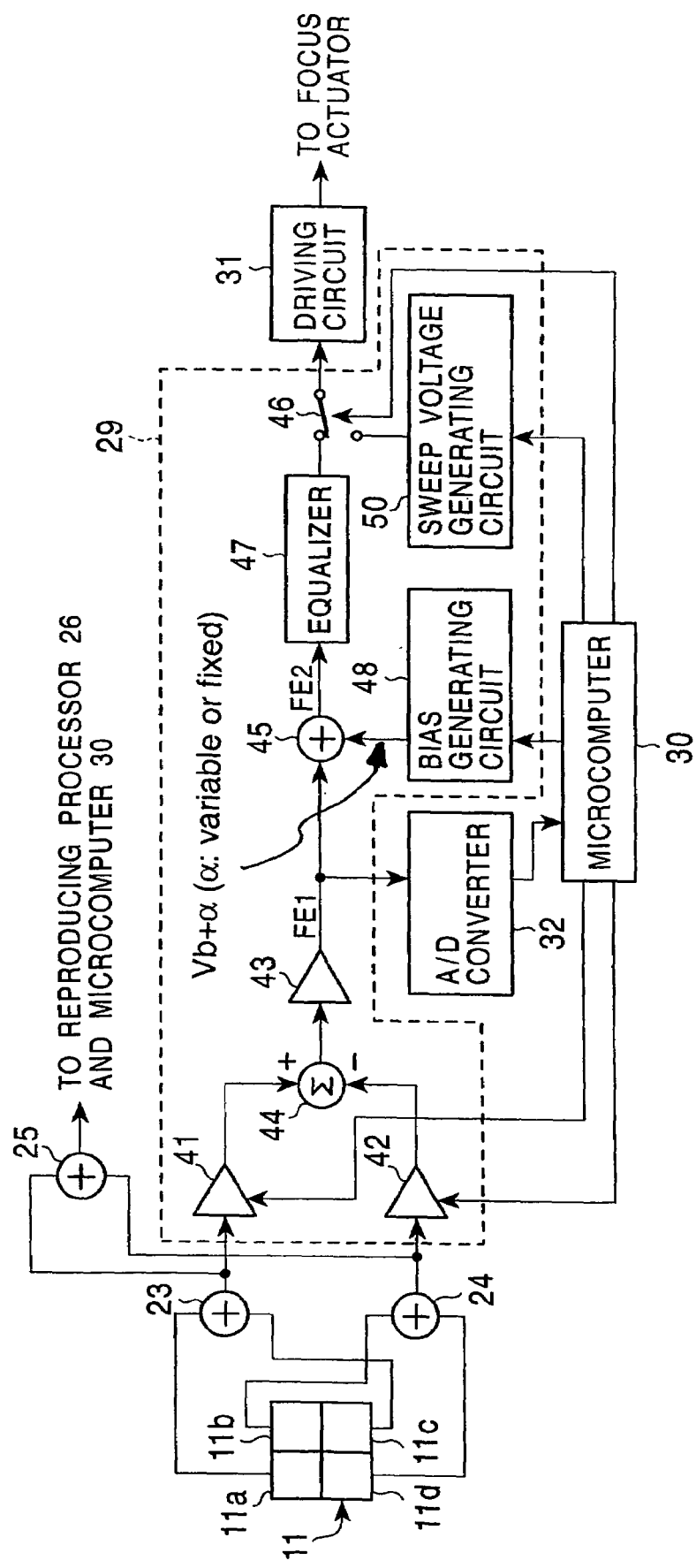
FIG. 2 is a block diagram showing a focus servo portion.

As shown in FIG. 2, the optical pickup 10 includes a four-element optical detector 11 having photodetector elements 11a–11d. The output signals of the photodetector elements 11a–11d are represented hereinbelow as "a", "b", "c", and "d", respectively. Sum signals, (a+c) and (b+d), of the output signals of two photodetector elements located symmetrically with respect to the intersection of two split lines on the photosensitive surface of the photodetector elements 11a–11d are generated in adders 23 and 24. An adder 25 is coupled to each of the outputs of the adders 23 and 24 to obtain the total sum (a+b+c+d) of the output signals of the photodetector elements 11a–11d at the adder 25 as a RF signal (i.e., a read signal).

A reproducing processor portion 26 is coupled to the output of the adder 25. In the reproducing processor portion 26, the information stored in the optical disc 12 is reproduced according to the RF signal.

A focus servo portion 29 is coupled to each of the outputs of the adders 23 and 24 to drivingly displace an objective lens (not shown) in the pickup 10 in the direction of the optical axis to focus the irradiated laser beam on the recording surface of the optical disc 12.

As shown in FIG. 2, the focus servo portion 29 includes amplifiers 41–43, a subtracter 44, an adder 45, a switch 46, an equalizer 47, a bias generating circuit 48, and a sweep voltage generating circuit 50.

The amplifier 41 is coupled to the adder 23, amplifying the output signal of the adder 23 to supply the signal to the positive input terminal of the subtracter 44. The amplifier 42 is coupled to the adder 24, amplifying the output signal of the adder 24 to supply the signal to the negative input terminal of the subtracter 44. The gain of the amplifiers 41–43 is made controllable with the control terminals thereof connected to a microcomputer 30 which is to be described later. The subtracter 44 subtracts the output signal level of the amplifier 42 from the output signal level of the amplifier 41. The output signal of the subtracter 44 is supplied to the adder 45 as a first focus error signal FE1 via the amplifier 43.

The adder 45 is further connected with the bias generating circuit 48. The bias generating circuit 48 supplies a bias voltage Vb to the adder 45. The microcomputer 30 controls the bias generating circuit 48 to generate the bias voltage Vb. The adder 45 adds the output signal of the amplifier 43 and the bias voltage Vb to supply the resultant signal to the equalizer 47 as a second focus error signal FE2. The equalizer 47 performs waveform equalizing processing on the supplied second focus error signal FE2, and then supplies the second focus error signal FE2 after having been subjected to waveform equalizing processing via the switch 46. The driving circuit 31 drives a focus actuator (not shown) in the optical pickup 10 according to the output signal of the equalizer 47, thereby displacing the aforementioned objective lens in the direction of the optical axis. Either one of the output signal from the equalizer 47 or the output signal from the sweep voltage generating circuit 50 is selectively supplied to the driving circuit 31 via the switch 46 in accordance with control by the microcomputer 30.

The sweep voltage generating circuit 50 generates a sweep voltage Vs, the level of which varies at a predetermined rate in accordance with a sweep command generated by the microcomputer 30. The sweep voltage Vs is the voltage for drivingly displacing the objective lens within a predetermined range of travel in order to obtain a peak value of the first focus error signal FE1. In addition, the sweep voltage Vs is changed up to a voltage corresponding to a predetermined focus position before the focus servo operation is initiated.

Output signals of the photodetector elements 11a–11d are supplied to a tracking servo portion 27. The tracking servo portion 27 controls the displacement driving of the objective lens in the radial direction so that the light beam is irradiated on the center of the tracks of the recording surface of the optical disc 12. Accordingly, the tracking servo portion 27 generates a tracking error signal in accordance with the output signals of the photodetector elements 11a–11d and outputs a tracking drive signal to a driving circuit 33 so as to reduce the tracking error signal. The driving circuit 33 drives the tracking actuator (not shown) in the pickup 10 in accordance with the tracking drive signal, thereby displacing the objective lens in the radial direction of the disc. Furthermore, additional photodetector other than the optical detector 11 can be provided in the pickup 10 and the output signal of the additional photodetector may be used in the tracking servo.

Each operation of the reproducing processor portion 26, the tracking servo portion 27, and the focus servo portion 29 is controlled by the microcomputer 30. The microcomputer 30 is supplied with the output signal FE1 of the amplifier 43 via an A/D converter 32, also being supplied with the output RF signal of the adder 25.

The operation of the microcomputer 30 is described hereinbelow. The microcomputer 30 performs a setup operation when the optical disc 12 is set to the disc player and then transfers to a reproduction operation.

Figure 3:
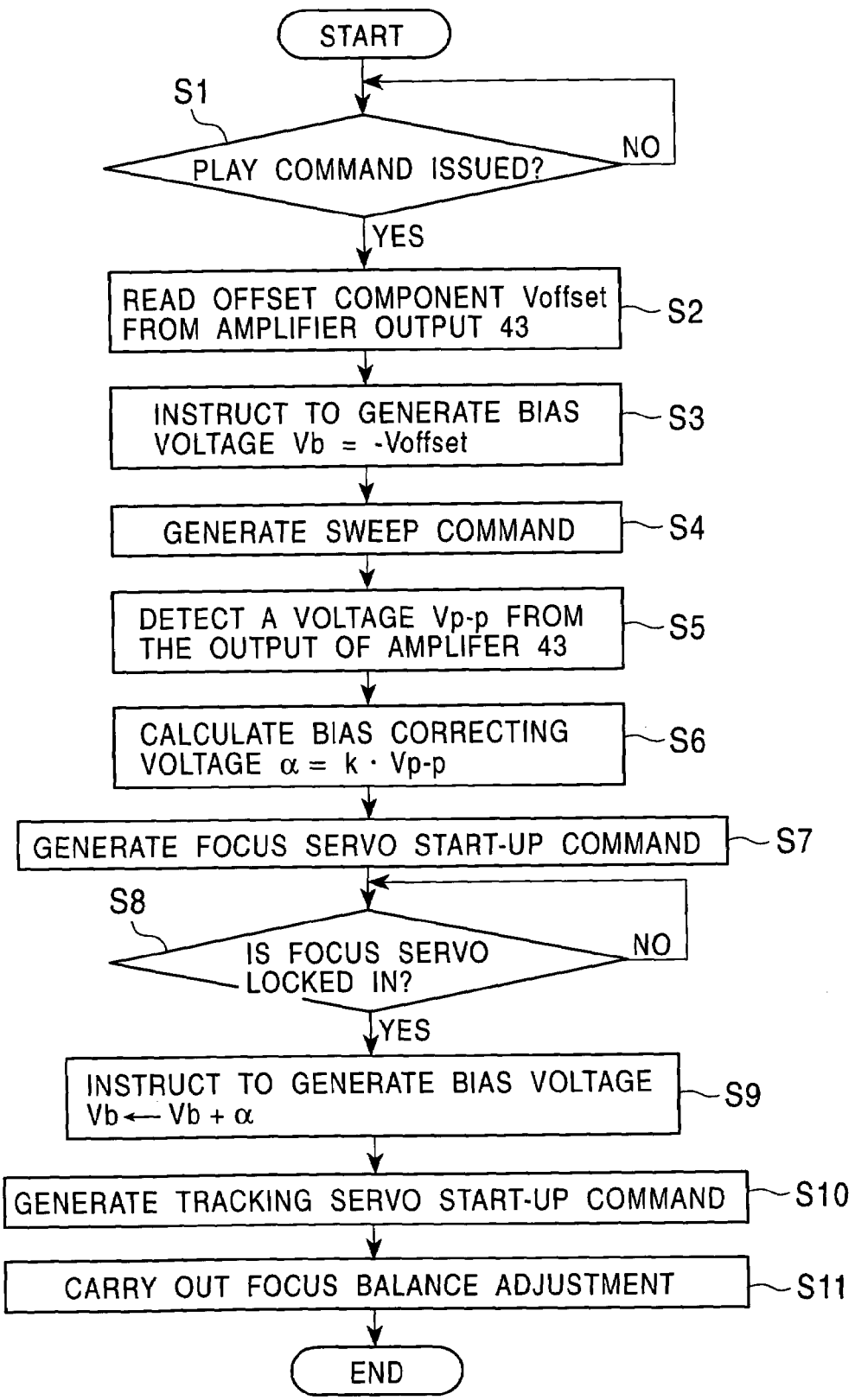
FIG. 3 is a flow diagram showing the set-up operation of a microcomputer.

In the set-up operation, as shown in FIG. 3, the microcomputer 30 determines whether a play command has been issued (step S1). The play command is generated at a manipulation portion when the play button (not shown) of the manipulation portion of the disc player is actuated. When the play command has been issued, the microcomputer 30 reads the level of the output signal FE1 of the amplifier 43 via the A/D converter 32 and sets the level as an offset component Voffset (step S2). Furthermore, at this time, the pickup 10 does not irradiate the laser beam but does in step S4 and from then on, which will be described later.

The microcomputer 30 sets the level of the bias voltage Vb (=−Voffset) so as to cancel out the offset component Voffset and instructs the bias generating circuit 48 to generate the bias voltage Vb with the set level (step S3). In response to the instruction, the bias generating circuit 48 supplies the bias voltage Vb of the set level to the adder 45. Accordingly, the output signal FE2 of the adder 45 becomes substantially zero and thus the electrical offset component has been eliminated.

Then, the microcomputer 30 generates the sweep command which is directed to the sweep voltage generating circuit 50 (step S4). The generation of the sweep command causes such a state to be created that the switch 46 relays the output signal of the sweep voltage generating circuit 50 to the driving circuit 31. The sweep voltage generating circuit 50 generates the sweep voltage Vs that changes its level at a predetermined rate in response to the sweep command from the microcomputer 30 and then supplies the sweep voltage to the driving circuit 31 via the switch 46. This allows the objective lens to move within the range of travel in the direction of the optical axis, thereby causing the first focus error signal FE1 outputted from the amplifier 43 to exhibit the S-curve characteristic. The microcomputer 30 reads the level of the output signal FE1 of the amplifier 43 via the A/D converter 32 to detect a peak-to-peak voltage Vp–p (step S5) and multiplies the peak-to-peak voltage Vp–p by a coefficient "k" (for example, k=1/40) to calculate the bias correcting voltage α (i.e., a predetermined voltage) (step S6). The bias correcting voltage α is the voltage level for causing the objective lens to move away from the optical disc 12. For, example, if the peak-to-peak voltage Vp-p corresponds to a focus drift of 8 μm, then the bias correcting voltage α corresponds to a focus drift of 0.2 μm.

Furthermore, a fixed value that has been set beforehand as the bias correcting voltage α may be used. In this case, the aforementioned steps S4–S6 need not to be carried out.

Furthermore, generation of the sweep voltage Vs that changes so as to obtain the aforementioned S-curve characteristic causes the sweep voltage generating circuit 50 to change the sweep voltage Vs up to a voltage corresponding to the predetermined focus position. This causes the objective lens to move to the focus position preparing for the initiation of the focus servo operation.

Then, the microcomputer 30 generates the focus servo start-up command (step S7). The focus servo start-up command causes the switch 46 to be switched over so that the output signal of the equalizer 47 is supplied to the driving circuit 31, thereby initiating the focus servo operation. The bias voltage Vb is added to the first focus error signal FE1 supplied from the amplifier 43 at the adder 45. As the result, the second focus error signal FE2 obtained in the adder 45 is supplied to the equalizer 47. The equalizer 47 performs the waveform equalizing processing on the supplied second focus error signal FE2, and the waveform-equalized second focus error signal FE2 is supplied to the driving circuit 31 via the switch 46. The driving circuit 31 drives the focus actuator in the pickup 10 to displace the objective lens in the direction of the optical axis in accordance with the output signal of the equalizer 47. In response to the driving operation, the levels of the output signals of the photodetector elements 11a–11d vary, thereby generating a new first focus error signal FE1.

After the focus servo operation has been initiated, the microcomputer 30 determines whether the focus servo has been locked in (step S8). More particularly, it is regarded that the lock-in state of the focus servo is established, in which the irradiated light beam is substantially focused on the recording surface of the optical disc 12, so that the level of the RF signal outputted from the adder 25 is read and the amplitude level is found to lie within the predetermined range. When having detected the lock-in state of the focus servo, the microcomputer 30 instructs the bias generating circuit 48 to generate the bias voltage of Vb+α (step S9) in stead of Vb.

In response to the instruction, the bias generating circuit 48 supplies the generated bias voltage Vb+α to the adder 45. This allows the adjustment of bias to be carried out, causing the first focus error signal FE1 to become the signal that is shifted by "–α" further from the state where the offset component has been removed in step S3.

After the execution of step S9, the microcomputer 30 generates the tacking servo start-up command (step S10). The tracking start-up command activates the tracking servo portion 27, thereby initiating the tracking servo operation.

After the execution of step S10, the microcomputer 30 adjusts the gain of each of the amplifiers 41 and 42, thereby carrying out the focus balance adjustment (step S11). In this focus balance adjustment, the gains of the amplifiers 41 and 42 are each adjusted so that the level of the RF signal outputted from the adder 25 is maximized. As a consequence, the effect of the drift component corresponding to the bias correcting voltage α included in the first focus error signal is eliminated.

When the optical disc has gone out of focus due to, for example, vibration during reproduction, the focus error signal FE1 substantially becomes Vb and the focus error signal FE2 outputted from the adder 45 substantially becomes α, so that α is supplied to the equalizer 47. Accordingly, the objective lens is displaced in the direction of the optical axis in accordance with the voltage α. However, the objective lens is moved away from the optical disc 12 by the voltage α, so that collision of the objective lens with the optical disc 12 is avoided.

In the case where the microcomputer 30 has already carried out the setup operation shown in FIG. 3 and the value of the bias voltage Vb is stored in the memory of the microcomputer 30, the microcomputer 30 can vary, in step S3, the value of the bias voltage Vb by the stored value of the previous bias voltage Vb, which is in turn generated by the bias generating circuit 48.

Furthermore, in the aforementioned embodiment, the bias voltage is applied at the input side of the equalizer 47, however, this may also be done at the output side.

Furthermore, in the aforementioned embodiment, an optical disc is employed as an optical recording medium, however, the optical recording medium is not limited to an optical disc and may be other optical recording medium such as an optical card.

Furthermore, in the aforementioned embodiment, the bias correcting voltage α is added to the bias voltage Vb after the focus servo start-up command is issued, however, the bias correcting voltage α may be added to the bias voltage Vb, which is outputted from the bias generating circuit 48, before the focus servo start-up command.

Furthermore, in the configuration shown in FIG. 2, such control may be employed, by providing an on/off switch between the adder 45 and the equalizer 47, that the on/off switch is turned on at the same time as the switching of the switch 46 when the focus servo start-up command is generated.

As described above, according to the present invention, the objective lens is prevented from colliding with the optical disc even if the objective lens is driven by a bias voltage to move in the direction of the optical axis when the objective lens is out of focus.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

What is claimed is:

1. A focus servo controller comprising:
an optical pickup, having a photodetector including a plurality of photodetector elements, for irradiating a light beam on an optical recording medium and detecting a reflected light beam from the optical recording medium by means of said photodetector,
amplifying means for amplifying the respective ones of two sum output signals from two sets of the photodetector elements located symmetrically with respect to a light-receiving center of said photodetector,
focus servo control means for generating a focus error signal in accordance with a difference between respective output levels of said amplifying means and for performing focus servo control by moving an objective lens in said optical pickup in an optical axis direction of said light beam in accordance with the focus error signal when a focus servo operation start-up command is supplied,
a lock-in state detecting portion for detecting a lock-in state of said focus servo control means,
focus balance adjusting means for adjusting gains of said amplifying means in accordance with the focus error signal to perform focus balance adjustment,
bias applying means for applying a bias voltage to a focus error signal line in said focus servo control means in accordance with said focus error signal, said bias voltage being a voltage for eliminating an electrical offset component in the focus error signal, and
a bias correcting voltage generator which adds a bias correcting voltage to said bias voltage in response to a detection of the lock-in state by said lock-in state detecting portion, said bias correcting voltage being a voltage for shifting said objective lens such that said objective lens maintains at least a predetermined distance from the optical recording medium to avoid a collision with the optical recording medium.

2. A focus servo controller according to claim 1, wherein:
said focus balance adjusting means performs the focus balance adjustment on the focus error signal generated in accordance with a resultant bias voltage by addition of said bias correcting voltage to said bias voltage.

3. A focus servo controller according to claim 2, further comprising:
means for generating a sweep voltage to move said objective lens in the direction of the optical axis of said light beam before starting a focus servo operation by said focus servo control means,
means for acquiring negative peak and positive peak values of the focus error signal while said sweep voltage is being generated, and
means for multiplying a coefficient to a level between said negative peak and positive peak values to set said bias correcting voltage.

4. A focus servo controller according to claim 1, wherein said bias correcting voltage is a fixed voltage.

5. A focus servo control method comprising the steps of:
irradiating a light beam on an optical recording medium,
detecting a reflected light beam from the optical recording medium by means of a photodetector having a plurality of photodetector elements,
amplifying, by means of amplifying means, the respective ones of two sum output signals from two sets of the photodetector elements located symmetrically each other with respect to a light-receiving center of said photodetector,
generating a focus error signal in accordance with a difference between respective output levels of said amplifying means,
performing focus servo control by moving an objective lens in an optical axis direction of said light beam in accordance with the focus error signal when a focus servo operation start-up command is supplied,
applying a bias voltage to a focus error signal line in accordance with said focus error signal,
generating the focus servo operation start-up command after said bias voltage has been applied,
detecting a lock-in state of the focus servo control,
adjusting gains of said amplifying means in accordance with the focus error signal to perform focus-balance adjustment, and
adding a bias correcting voltage to said bias voltage in response to a detection of the lock-in state, said bias correcting voltage being a voltage for shifting said objective lens such that said objective lens maintains at least a predetermined distance from the optical recording medium to avoid a collision with the optical recording medium.

6. A focus servo control method according to claim 5, wherein said bias correcting voltage is a fixed voltage.

* * * * *